United States Patent
Lin

(10) Patent No.: US 11,714,771 B2
(45) Date of Patent: Aug. 1, 2023

(54) USB SIGNAL TRANSMISSION DEVICE, OPERATION METHOD THEREOF, AND USB CABLE

(71) Applicant: GENESYS LOGIC, INC., New Taipei (TW)

(72) Inventor: Ching-Hsiang Lin, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 0 days.

(21) Appl. No.: 17/522,922

(22) Filed: Nov. 10, 2021

(65) Prior Publication Data
US 2022/0171732 A1   Jun. 2, 2022

(30) Foreign Application Priority Data
Dec. 1, 2020  (TW) ................. 109142147

(51) Int. Cl.
  *G06F 13/40*  (2006.01)
  *G06F 13/38*  (2006.01)
  *G06F 13/42*  (2006.01)

(52) U.S. Cl.
  CPC ........ *G06F 13/4022* (2013.01); *G06F 13/382* (2013.01); *G06F 13/4282* (2013.01); *G06F 2213/0042* (2013.01)

(58) Field of Classification Search
  CPC .................................................. G06F 13/4282
  See application file for complete search history.

(56) References Cited

U.S. PATENT DOCUMENTS

| 2013/0241638 A1* | 9/2013 | Zhu ..................... G06F 13/4045 330/69 |
| 2020/0350899 A1* | 11/2020 | Huang ................. H03K 17/005 |

FOREIGN PATENT DOCUMENTS

CN           105375207           3/2016

* cited by examiner

*Primary Examiner* — Henry Tsai
*Assistant Examiner* — Juanito C Borromeo
(74) *Attorney, Agent, or Firm* — JCIPRNET

(57) ABSTRACT

A universal serial bus (USB) signal transmission device, an operation method thereof, and a USB cable are provided. The USB signal transmission device includes a signal processing circuit, a switch circuit, and a control circuit. A first terminal of the switch circuit is coupled to a first USB circuit. A second terminal of the switch circuit is coupled to a second USB circuit. The control circuit turns off the switch circuit during a detection period to detect both terminals of the switch circuit to obtain a detection result. The control circuit turns on the switch circuit during a transmission period, and controls a transmission direction of the signal processing circuit according to the detection result.

21 Claims, 3 Drawing Sheets

USB SIGNAL TRANSMISSION DEVICE, OPERATION METHOD THEREOF, AND USB CABLE

CROSS-REFERENCE TO RELATED APPLICATION

This application claims the priority benefit of Taiwan application serial no. 109142147, filed on Dec. 1, 2020. The entirety of the above-mentioned patent application is hereby incorporated by reference herein and made a part of this specification.

BACKGROUND

Technical Field

The disclosure relates to a universal serial bus (USB) equipment, and particularly relates to a USB signal transmission device, an operation method thereof, and a USB cable.

Description of Related Art

The USB is widely used as a data transmission interface between a host and a device. In addition to the USB protocol, based on application requirements, the USB data transmission path may be applied to other communication protocols, such as the DisplayPort (DP) protocol, the Thunderbolt protocol, the high definition multimedia interface (HDMI) protocol, or other communication protocols. The power delivery (PD) controller of the host may negotiate the USB configuration (to run on which type of communication protocol) with the PD controller of the device via the configuration channel (CC) pins of the USB connector.

For example, the USB connector of the host may operate in a DP alternate mode (also known as a DP ALT mode) that complies with the USB specification (such as USB 3.2 specification). When the host is operating in the DP ALT mode, the differential pin pair (high-speed data transmission channels, such as a D+ and D− pin pair, a TX1+ and TX1− pin pair, a RX1+ and RX1− pin pair, a TX2+ and TX2− pin pair, and/or a RX2+ and RX2− pin pair specified by the USB specification) of the USB connector may be used to transmit data that complies with the DP specification, and the side band use (SBU) pins of the USB connector may be used to transmit an auxiliary channel (AUX channel or AUX_CH) signal that complies with the DP specification.

In the DP ALT mode, the 4 high-speed data transmission channels of the USB connector have the same transmission direction (single direction), but in the USB data transmission mode, different high-speed data transmission channels of the USB connector have different transmission directions. In order to extend the data transmission distance, the USB signal transmission device, such as a USB repeater, may be used in the USB data transmission path. In the DP ALT mode, the USB signal transmission device needs to determine the DP transmission direction.

It should be noted that the content of the "Description of Related Art" section is used to help understand the disclosure. Part of the content (or all of the content) disclosed in the "Description of Related Art" section may not be the conventional technology known to persons skilled in the art. The content disclosed in the "Description of Related Art" section does not represent that the content is already known to persons skilled in the art before the application of the disclosure.

SUMMARY

The disclosure provides a universal serial bus (USB) signal transmission device, an operation method thereof, and a USB cable to determine a transmission direction of a signal processing circuit.

In an embodiment of the disclosure, the USB signal transmission device is coupled between a first USB circuit and a second USB circuit. The USB signal transmission device includes a signal processing circuit, a switch circuit, and a control circuit. A first differential terminal pair of the signal processing circuit is adapted to be coupled to a differential pin pair of the first USB circuit. A second differential terminal pair of the signal processing circuit is adapted to be coupled to a differential pin pair of the second USB circuit. A first terminal of the switch circuit is adapted to be coupled to the first USB circuit. A second terminal of the switch circuit is adapted to be coupled to the second USB circuit. The control circuit is coupled to a control terminal of the switch circuit and a control terminal of the signal processing circuit. The control circuit turns off the switch circuit during a detection period, and detects the switch circuit to obtain a detection result. The control circuit turns on the switch circuit according to the detection result, and controls a transmission direction of the signal processing circuit.

In an embodiment of the disclosure, the operation method includes the following steps. A first USB circuit and a second USB circuit are connected with a USB signal transmission device. A switch circuit in the USB signal transmission device is turned off, and a first terminal and a second terminal of the switch circuit are detected to obtain a detection result. The first terminal of the switch circuit is adapted to be coupled to the first USB circuit. The second terminal of the switch circuit is adapted to be coupled to the second USB circuit. A transmission direction of a signal processing circuit in the USB signal transmission device is controlled according to the detection result, and the switch circuit is turned on.

In an embodiment of the disclosure, the USB cable includes a first USB circuit, a second USB circuit, and a USB signal transmission device. The USB signal transmission device includes a signal processing circuit, a switch circuit, and a control circuit. A first differential terminal pair of the signal processing circuit is coupled to a differential pin pair of the first USB circuit. A second differential terminal pair of the signal processing circuit is coupled to a differential pin pair of the second USB circuit. A first terminal of the switch circuit is coupled to the first USB circuit. A second terminal of the switch circuit is coupled to the second USB circuit. The control circuit is coupled to a control terminal of the switch circuit and a control terminal of the signal processing circuit. During a detection period, the control circuit turns off the switch circuit, and the control circuit detects the first terminal of the switch circuit and the second terminal of the switch circuit to obtain a detection result. During a transmission period after the detection period, the control circuit turns on the switch circuit, and the control circuit controls a transmission direction of the signal processing circuit according to the detection result.

Based on the above, the USB signal transmission device according to the embodiments of the disclosure may detect the switch circuit during the detection period to obtain the detection result. According to the detection result, the control circuit may determine/change the transmission direction of the signal processing circuit.

In order for the features and advantages of the disclosure more comprehensible, the following specific embodiments are described in detail in conjunction with the accompanying drawings.

DETAILED DESCRIPTION OF DISCLOSED EMBODIMENTS

Figure 1:
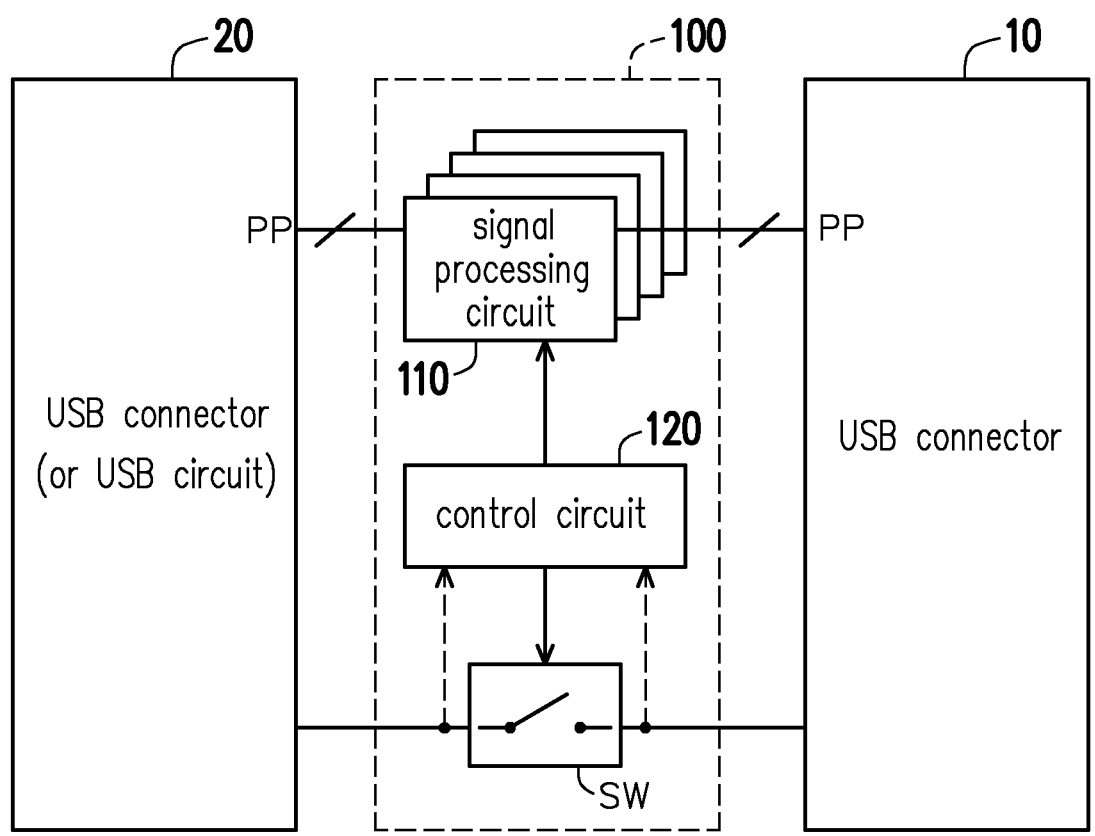
FIG. 1 is a schematic diagram of a circuit block of a universal serial bus (USB) system according to an embodiment of the disclosure.

FIG. 1 is a schematic diagram of a circuit block of a universal serial bus (USB) system according to an embodiment of the disclosure. According to design requirements, in some embodiments, the USB system shown in FIG. 1 may be a USB host, a USB cable, or a USB device. The USB system shown in FIG. 1 includes a USB signal transmission device 100. The USB signal transmission device 100 may be coupled between a first USB circuit and a second USB circuit. In the embodiment shown in FIG. 1, the first USB circuit may include a USB connector 10 and/or a USB interface circuit, and the second USB circuit may include a USB connector (or a USB circuit, such as a USB controller) 20 and/or another USB interface circuit. In other embodiments, the first USB circuit may include a USB circuit (such as a USB controller).

For example, in the case where the USB system shown in FIG. 1 is a USB host (such as a tablet computer, a personal computer, or other electronic devices), a block 20 shown in FIG. 1 may be a USB circuit (a host circuit, such as a USB controller), and the USB signal transmission device 100 may be coupled between the USB connector 10 (the first USB circuit) and the USB circuit 20 (the second USB circuit) to serve as a buffer of the USB connector 10. In the case where the USB system shown in FIG. 1 is a USB device (such as a data storage device, a display, or other USB devices), the block 20 shown in FIG. 1 may be a USB circuit (a device circuit, such as a USB controller), and the USB signal transmission device 100 may be coupled between the USB connector 10 (the first USB circuit) and the USB circuit 20 (the second USB circuit) to serve as the buffer of the USB connector 10. In the case where the USB system shown in FIG. 1 is a USB cable, the block 20 shown in FIG. 1 may be a USB connector, and the USB signal transmission device 100 may be coupled between the USB connector 10 (the first USB circuit) at one terminal of the USB cable and the USB connector 20 (the second USB circuit) at the other terminal of the USB cable to serve as a USB repeater of the USB cable.

The USB signal transmission device 100 shown in FIG. 1 includes a signal processing circuit 110, a control circuit 120, and a switch circuit SW. A first differential terminal pair of the signal processing circuit 110 is coupled to a differential pin pair PP of the USB connector 10. A second differential terminal pair of the signal processing circuit 110 is adapted to be coupled to a differential pin pair PP of the USB connector (or the USB circuit) 20. According to design requirements, the differential pin pair PP may include high-speed data transmission channels specified by the USB specification, such as a D+ and D− pin pair, a TX1+ and TX1− pin pair, a RX1+ and RX1− pin pair, a TX2+ and TX2− pin pair, and/or a RX2+ and RX2− pin pair. Taking a USB type-C connector as an example, the differential pin pair PP may include 4 high-speed data transmission channels "TX1+ and TX1−", "RX1+ and RX1−", "TX2+ and TX2−", and "RX2+ and RX2−". It should be noted that the number of signal processing circuits 110 matches the number of differential pin pairs PP.

The USB protocol may output data through the high-speed data transmission channels "TX1+ and TX1−" and/or "TX2+ and TX2−", and receive data through the high-speed data transmission channels "RX1+ and RX1−" and/or "RX2+ and RX2−". The USB specification (such as USB 3.2 specification) has also developed a DisplayPort alternative mode (DP alternate mode or DP ALT mode). Based on application requirements, in the DP ALT mode, the differential pin pair PP (high-speed data transmission channels) may be applied to other communication protocols, such as the DisplayPort (DP) protocol, the Thunderbolt protocol, the high definition multimedia interface (HDMI) protocol, and/or other communication protocols.

A first terminal of the switch circuit SW is coupled to the USB connector 10. A second terminal of the switch circuit SW is adapted to be coupled to the USB connector (or the USB circuit) 20. The control circuit 120 is coupled to a control terminal of the switch circuit SW and a control terminal of the signal processing circuit 110.

According to different design requirements, the control circuit 120 may be implemented in hardware, firmware, software (that is, program), or a combination of multiple of the three. In terms of hardware, the control circuit 120 may be implemented as a logic circuit on an integrated circuit. The relevant functions of the control circuit 120 may be implemented as hardware by using hardware description languages (for example, Verilog HDL or VHDL) or other suitable programming languages. For example, the relevant functions of the control circuit 120 may be implemented in one or more controllers, microcontrollers, microprocessors, application-specific integrated circuits (ASICs), digital signal processors (DSPs), field programmable gate arrays (FPGAs), and/or various logic blocks, modules, and circuits in other processing units. In terms of software and/or firmware, the relevant functions of the control circuit 120 may be implemented as programming codes. For example, general programming languages (such as C, C++, or assembly languages) or other suitable programming languages are used to implement the control circuit 120. The controller, microcontroller, or microprocessor may read and execute the programming code from a recording medium, so as to implement the relevant functions of the control circuit 120.

Figure 2:
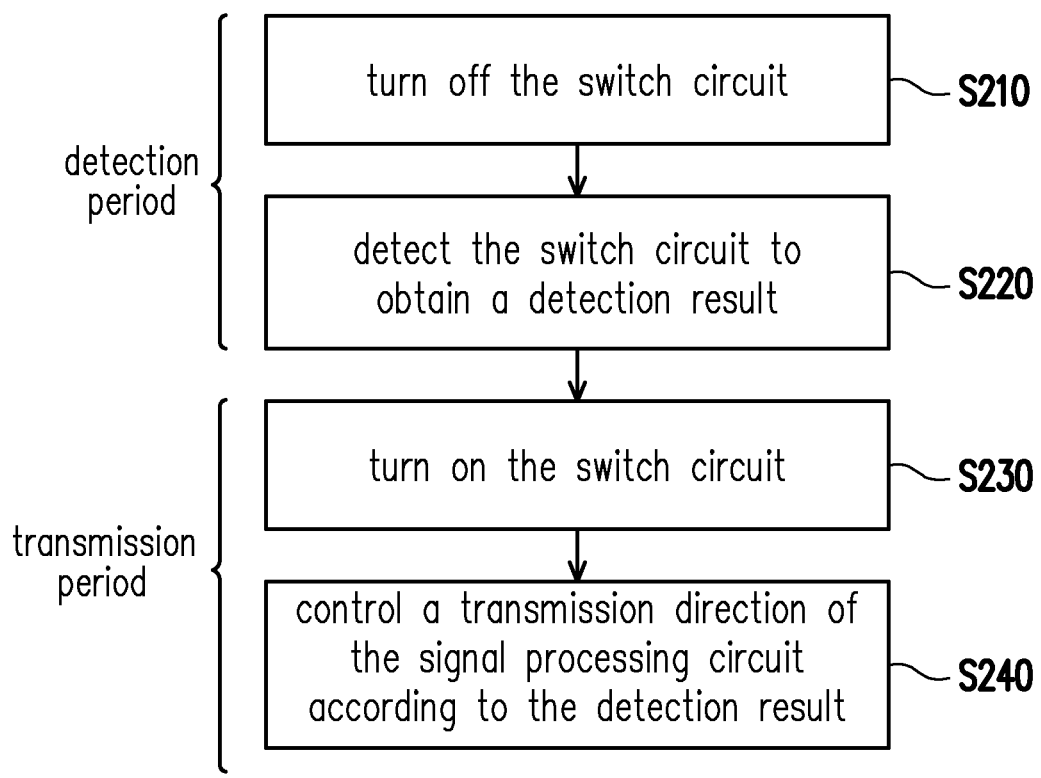
FIG. 2 is a schematic diagram of a flowchart of an operation method of a USB signal transmission device according to an embodiment of the disclosure.

FIG. 2 is a schematic diagram of a flowchart of an operation method of a USB signal transmission device according to an embodiment of the disclosure. Please refer to FIG. 1 and FIG. 2, the USB signal transmission device 100 is connected to the first USB circuit (such as the USB connector 10) and the second USB circuit (such as the USB connector (or the USB circuit) 20). During a detection period, the control circuit 120 may turn off the switch circuit SW in the USB signal transmission device 100 in Step S210. The control circuit 120 may detect the switch circuit SW during the period when the switch circuit SW is turned off to obtain a detection result (Step S220). For example, during the detection period, the control circuit 120 may detect the first terminal of the switch circuit SW and the second terminal of the switch circuit SW to obtain the detection result in Step S220. The control circuit 120 may turn on the switch circuit SW according to the detection result, and control a transmission direction of the signal processing circuit 110. For example, in a transmission period after the detection period (such as during a normal operation period), the control circuit 120 may turn on the switch circuit SW according to the detection result (Step S230), and the control circuit 120 may control the transmission direction of the signal processing circuit 110 according to the detection result (Step S240).

For example, the control circuit 120 may detect the first terminal of the switch circuit SW and the second terminal of the switch circuit SW to obtain the detection result. When the detection result indicates that "the first terminal of the switch circuit SW has a communication protocol signal" and "the second terminal of the switch circuit SW has no signal", the control circuit 120 may turn on the switch circuit SW, and set the transmission direction of the signal processing circuit 110 to "transmit from the first differential terminal pair to the second differential terminal pair". That is, the differential dataflow is transmitted from the differential pin pair PP of the USB connector 10 to the differential pin pair PP of the USB connector (or the USB circuit) 20. The "communication protocol signal" may be defined according to design requirements. For example, the communication protocol signal may include, but not limited to, a periodic pulse signal and/or other predefined signal patterns. Conversely, when the detection result indicates that "the first terminal of the switch circuit SW has no signal" and "the second terminal of the switch circuit SW has a communication protocol signal", the control circuit 120 may turn on the switch circuit SW, and set the transmission direction of the signal processing circuit 110 to "transmit from the second differential terminal pair to the first differential terminal pair". That is, the differential dataflow is transmitted from the differential pin pair PP of the USB connector (or the USB circuit) 20 to the differential pin pair PP of the USB connector 10.

The control circuit 120 may also determine whether to end the detection period to enter the transmission period according to the detection result. For example, when the detection result indicates that "the first terminal of the switch circuit SW has no signal" and "the second terminal of the switch circuit SW has no signal", the control circuit 120 may maintain the detection period. When the detection result indicates that "the first terminal of the switch circuit SW has a communication protocol signal" and "the second terminal of the switch circuit SW has a communication protocol signal", the control circuit 120 may maintain the detection period. When the detection result indicates that "one of the first terminal and the second terminal of the switch circuit SW has no signal" and "the other one of the first terminal and the second terminal of the switch circuit SW has the communication protocol signal", the control circuit 120 may end the detection period to enter the transmission period.

For example, after a DP source equipment detects a DP sink equipment through a hot plug detect mechanism, the DP source equipment will send an auxiliary channel (AUX channel or AUX_CH) signal that complies with the DP specification via the AUX_CH to the DP sink equipment. The AUX_CH signal includes active pre-charge pulses, a preamble symbol, and a start symbol. The active pre-charge pulses and the preamble symbol are periodic pulse signals. While waiting for/receiving the AUX_CH signal sent by the DP source equipment, the AUX_CH of the DP sink equipment will not send a signal.

When the USB connector 10 is connected with the DP source equipment (not shown), and when the USB connector 20 is connected with the DP sink equipment (not shown) (or the USB circuit 20 is dynamically configured as a DP sink equipment role), the DP source equipment will send the AUX_CH signal via side band use (SBU) pins SBU1 and SBU2 of the USB connector 10 during the detection period, and the DP sink equipment will wait to receive the AUX_CH signal from the SBU pins SBU1 and SBU2 of the USB connector (or the USB circuit) 20 during the detection period. Therefore, during the detection period, in the case where the switch circuit SW is turned off, the control circuit 120 may detect that the first terminal of the switch circuit SW "has a communication protocol signal", and the second terminal of the switch circuit SW "has no signal". As such, the control circuit 120 may know when the USB connector 10 is connected with the DP source equipment, and the USB connector 20 is connected with the DP sink equipment (or the USB circuit 20 is dynamically configured as the DP sink equipment role), thereby determining that the transmission direction of the signal processing circuit 110 is "from the USB connector 10 to the USB connector (or the USB circuit) 20". After determining the transmission direction of the signal processing circuit 110, the control circuit 120 may instantly turn on the switch circuit SW, so that the DP source equipment may send the AUX_CH signal to the DP sink equipment. Therefore, during the transmission period after the detection period, the control circuit 120 continues to turn on the switch circuit SW, and the control circuit 120 may control the transmission direction of the signal processing circuit 110 as "from the USB connector 10 to the USB connector (or the USB circuit) 20".

By analogy, when the USB connector 10 is connected with the DP sink equipment (not shown), and when the USB connector 20 is connected with the DP source equipment (not shown) (or the USB circuit 20 is dynamically configured as the DP source equipment role), during the detection period and in the case where the switch circuit SW is turned off, the control circuit 120 may detect that the first terminal of the switch circuit SW "has no signal", and the second terminal of the switch circuit SW "has a communication protocol signal". As such, the control circuit 120 may know when the USB connector 10 is connected with the DP sink equipment, and the USB connector 20 is connected with the DP source equipment (or the USB circuit 20 is dynamically configured as the DP source equipment role), thereby determining that the transmission direction of the signal processing circuit 110 is "from the USB connector (or the USB circuit) 20 to the USB connector 10". During the transmission period after the detection period, the control circuit 120 turns on the switch circuit SW, and the control circuit 120 may control the transmission direction of the signal processing circuit 110 as "from the USB connector (or the USB circuit) 20 to the USB connector 10".

Figure 3:
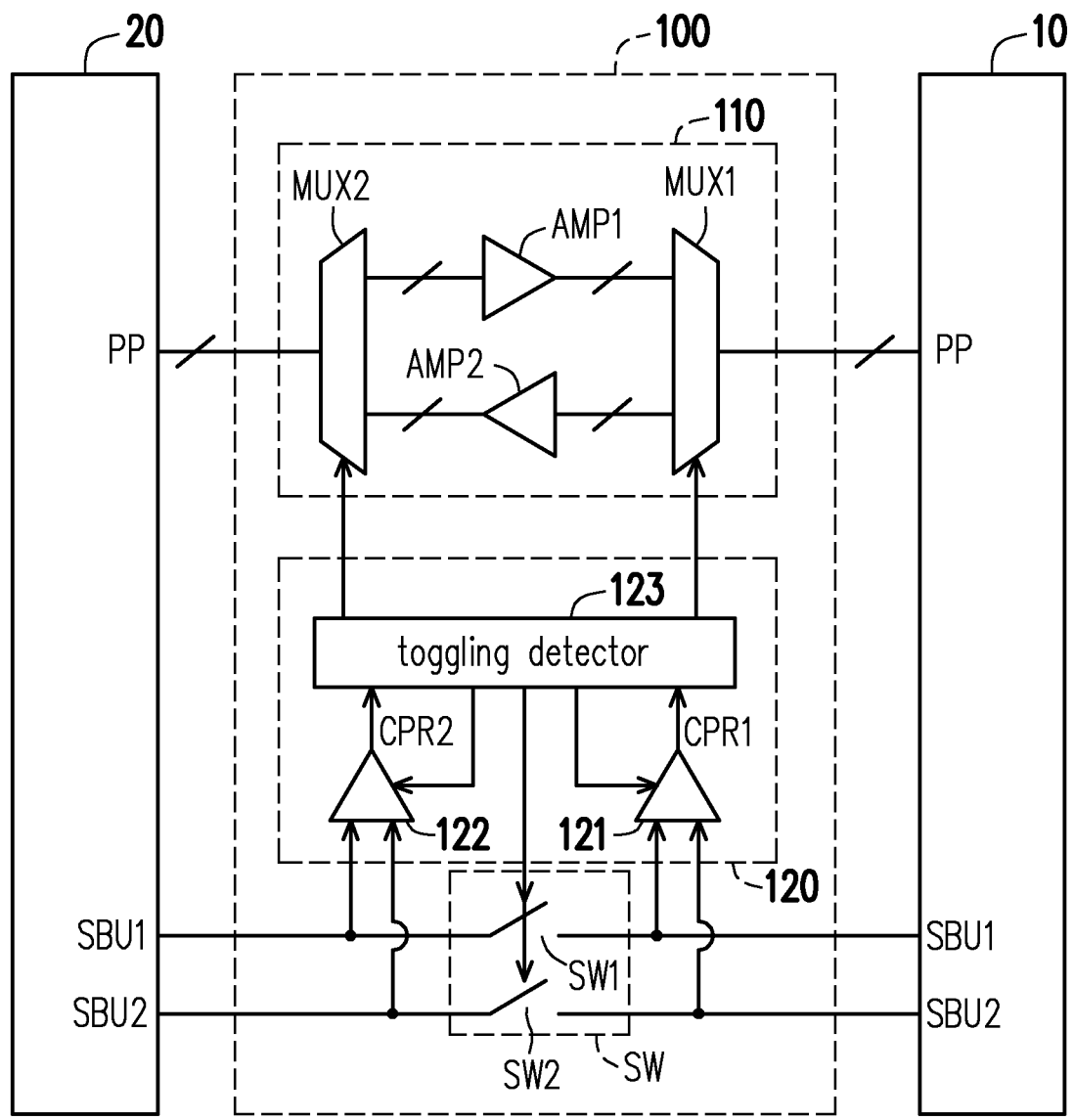
FIG. 3 is a schematic diagram of a circuit block illustrating a switch circuit, a signal processing circuit, and a control circuit shown in FIG. 1 according to an embodiment of the disclosure.

FIG. 3 is a schematic diagram of a circuit block illustrating the switch circuit SW, the signal processing circuit 110, and the control circuit 120 shown in FIG. 1 according to an embodiment of the disclosure. Please refer to FIG. 1 and FIG. 3. The signal processing circuit 110 shown in FIG. 3 includes a routing circuit MUX1, a routing circuit MUX2, an amplifier AMP1, and an amplifier AMP2. A common differential terminal pair of the routing circuit MUX1 may serve the first differential terminal pair of the signal processing circuit 110 to be coupled to the differential pin pair PP of the USB connector 10. A common differential terminal pair of the routing circuit MUX2 may serve as the second differential terminal pair of the signal processing circuit 110 to be coupled to the differential pin pair PP of the USB connector (or the USB circuit) 20. A first selection differential terminal pair of the routing circuit MUX2 is coupled to an input terminal pair of the amplifier AMP1, and a second selection differential terminal pair of the routing circuit MUX2 is coupled to an output terminal pair of the amplifier AMP2. A first selection differential terminal pair of the routing circuit MUX1 is coupled to an output terminal pair of the amplifier AMP1, and a second selection differential terminal pair of the routing circuit MUX1 is coupled to an input terminal pair of the amplifier AMP2.

A control terminal of the routing circuit MUX1 and a control terminal of the routing circuit MUX2 are both coupled to the control circuit 120. The control circuit 120 may control the routing circuit MUX1 and the routing circuit MUX2 according to a first detection result and a second detection result. For example, when the USB connector 10 is connected with the DP source equipment (not shown), and when the USB connector 20 is connected with the DP sink equipment (not shown) (or the USB circuit 20 is dynamically configured as the DP sink equipment role), the routing circuit MUX1 may couple the differential pin pair PP of the USB connector 10 to the input terminal pair of the amplifier AMP2, and the routing circuit MUX2 may couple the output terminal pair of the amplifier AMP2 to the differential pin pair PP of the USB connector (or the USB circuit) 20. When the USB connector 10 is connected with the DP sink equipment (not shown), and when the USB connector 20 is connected with the DP source equipment (not shown) (or the USB circuit 20 is dynamically configured as the DP source equipment role), the routing circuit MUX2 may couple the differential pin pair PP of the USB connector (or the USB circuit) 20 to the input terminal pair of the amplifier AMP1, and the routing circuit MUX1 may couple the output terminal pair of the amplifier AMP1 to the differential pin pair PP of the USB connector 10.

The switch circuit SW shown in FIG. 3 includes a switch SW1 and a switch SW2. A first terminal of the switch SW1 is coupled to the SBU pin SBU1 of the USB connector 10. A second terminal of the switch SW1 is adapted to be coupled to the SBU pin SBU1 of the USB connector (or the USB circuit) 20. A first terminal of the switch SW2 is coupled to the SBU pin SBU2 of the USB connector 10. A second terminal of the switch SW2 is adapted to be coupled to the SBU pin SBU2 of the USB connector (or the USB circuit) 20. The control circuit 120 is coupled to a control terminal of the switch SW1, a control terminal of the switch SW2, and the control terminal of the signal processing circuit 110.

During the detection period (a period during which the first terminal and the second terminal of the switch circuit SW are detected), the control circuit 120 may turn off the switch SW1 and the switch SW2. The control circuit 120 may detect the first terminal of the switch SW1 and the first terminal of the switch SW2 to obtain the first detection result. The control circuit 120 may also detect the second terminal of the switch SW1 and the second terminal of the switch SW2 to obtain the second detection result. The control circuit 120 may turn on the switch SW1 and the switch SW2 according to the first detection result and the second detection result, and control the transmission direction of the signal processing circuit 110. For example, during the transmission period (such as the normal operation period), the control circuit 120 may turn on the switch SW1 and the switch SW2 according to the first detection result and the second detection result, and the control circuit 120 may control the transmission direction of the signal processing circuit 110 according to the first detection result and the second detection result.

When the first detection result indicates that "there is a communication protocol signal" and the second detection result indicates that "there is no signal", the control circuit 120 may turn on the switch SW1 and the switch SW2, and set the transmission direction of the signal processing circuit 110 to "transmit from the first differential terminal pair to the second differential terminal pair". That is, the differential dataflow is transmitted from the differential pin pair PP of the USB connector 10 to the differential pin pair PP of the USB connector (or the USB circuit) 20. Conversely, when the first detection result indicates that "there is no signal" and the second detection result indicates that "there is a communication protocol signal", the control circuit 120 may turn on the switch SW1 and the switch SW2, and set the transmission direction of the signal processing circuit 110 to "transmit from the second differential terminal pair to the first differential terminal pair". That is, the differential dataflow is transmitted from the differential pin pair PP of the USB connector (or the USB circuit) 20 to the differential pin pair PP of the USB connector 10.

The control circuit 120 may also determine whether to end the detection of the first terminal and the second terminal of the switch circuit SW to control the transmission direction of the signal processing circuit 110 according to the first detection result and the second detection result, and turn on the switch SW1 and the switch SW2. That is, the control circuit 120 may determine whether to end the detection period to enter the transmission period (such as the normal operation period) according to the first detection result and the second detection result. For example, when the first detection result and the second detection result both indicate that "there is no signal", the control circuit 120 may maintain the detection period. When the first detection result and the second detection result both indicate that "there is a communication protocol signal", the control circuit 120 may maintain the detection period. When one of the first detection result and the second detection result indicates that "there is no signal" and the other of the first detection result and the second detection result indicates that "there is a communication protocol signal", the control circuit 120 may end the detection of the first terminal and the second terminal of the switch circuit SW (that is, end the detection period to enter the transmission period) to control the transmission direction of the signal processing circuit 110 and turn on the switch SW1 and the switch SW2.

For example, when the USB connector 10 is connected with the DP source equipment (not shown), and when the USB connector 20 is connected with the DP sink equipment (not shown) (or the USB circuit 20 is dynamically configured as the DP sink equipment role), the DP source equipment will send the AUX_CH signal via the SBU pins SBU1 and SBU2 of the USB connector 10 during the detection period, and the DP sink equipment will wait to receive the AUX_CH signal from the SBU pins SBU1 and SBU2 of the USB connector (or the USB circuit) 20 during the detection period. Therefore, during the detection period, in the case where the switch SW1 and the switch SW2 are turned off, the control circuit 120 may detect that the first terminals of the switch SW1 and the switch SW2 "have communication protocol signals" (the first detection result), and the second terminals of the switch SW1 and the switch SW2 "have no signal" (the second detection result). As such, the control circuit 120 may know when the USB connector 10 is connected with the DP source equipment, and the USB connector 20 is connected with the DP sink equipment (or the USB circuit 20 is dynamically configured as the DP sink equipment role), thereby determining that the transmission direction of the signal processing circuit 110 is "from the USB connector 10 to the USB connector (or the USB circuit) 20". After determining the transmission direction of the signal processing circuit 110, the control circuit 120 may instantly turn on the switch SW1 and the switch SW2, so that the DP source equipment may send the AUX_CH signal to the DP sink equipment. Therefore, during the transmission period after the detection period, the control circuit 120 continues to turn on the switch SW1 and the switch SW2, and the control circuit 120 may control the transmission direction of the signal processing circuit 110 as "from the USB connector 10 to the USB connector (or the USB circuit) 20".

By analogy, when the USB connector 10 is connected with the DP sink equipment (not shown), and when the USB connector 20 is connected with the DP source equipment (not shown) (or the USB circuit 20 is dynamically configured as the DP source equipment role), during the detection period and in the case where the switch SW1 and the switch SW2 are turned off, the control circuit 120 may detect that the first terminals of the switch SW1 and the switch SW2 "have no signal" (the first detection result), and the second terminals of the switch SW1 and the switch SW2 "have communication protocol signals" (the second detection result). As such, the control circuit 120 may know when the USB connector 10 is connected with the DP sink equipment, and the USB connector 20 is connected with the DP source equipment (or the USB circuit 20 is dynamically configured as the DP source equipment role), thereby determining that the transmission direction of the signal processing circuit 110 is "from the USB connector (or the USB circuit) 20 to the USB connector 10". During the transmission period after the detection period, the control circuit 120 turns on the switch SW1 and the switch SW2, and the control circuit 120 may control the transmission direction of the signal processing circuit 110 as "from the USB connector (or the USB circuit) 20 to the USB connector 10".

The control circuit 120 shown in FIG. 3 includes a voltage comparator 121, a voltage comparator 122, and a toggling detector 123. A first input terminal and a second input terminal of the voltage comparator 121 are respectively coupled to the first terminal of the switch SW1 and the first terminal of the switch SW2. The voltage comparator 121 compares the voltage of the first terminal of the switch SW1 with the voltage of the first terminal of the switch SW2 to obtain a first detection result CPR1. A first input terminal and a second input terminal of the voltage comparator 122 are respectively coupled to the second terminal of the switch SW1 and the second terminal of the switch SW2. The voltage comparator 122 compares the voltage of the second terminal of the switch SW1 with the voltage of the second terminal of the switch SW2 to obtain a second detection result CPR2. The toggling detector 123 is coupled to an output terminal of the voltage comparator 121 to obtain the first detection result CPR1. The toggling detector 123 is coupled to an output terminal of the voltage comparator 122 to obtain the second detection result CPR2. The toggling detector 123 may control the transmission direction of the signal processing circuit 110 according to the first detection result CPR1 and the second detection result CPR2. That is, the toggling detector 123 may control the routing circuit MUX1 and the routing circuit MUX2 according to the first detection result CPR1 and the second detection result CPR2.

During the detection period (that is, the period during which the first terminal and the second terminal of the switch circuit SW are detected), the toggling detector 123 may turn off the switch SW1 and the switch SW2, and the toggling detector 123 may enable the voltage comparator 121 and the voltage comparator 122 to obtain the first detection result CPR1 and the second detection result CPR2. The toggling detector 123 may turn on the switch SW1 and the switch SW2 according to the first detection result CPR1 and the second detection result CPR2, and the toggling detector 123 may disable the voltage comparator 121 and the voltage comparator 122. For example, during the transmission period (that is, the period during which the transmission direction of the signal processing circuit 110 is controlled and the switch SW1 and the switch SW2 are turned on, such as the normal operation period), the toggling detector 123 may turn on the switch SW1 and the switch SW2, and the toggling detector 123 may disable the voltage comparator 121 and the voltage comparator 122 to reduce power consumption.

In summary, the USB signal transmission device 100 according to the foregoing embodiments may detect the SBU pins during the detection period to obtain the detection result. According to the detection result, the control circuit may determine the transmission direction of the DP dataflow of the differential pin pair PP, thereby determining/changing the transmission direction of the signal processing circuit 110.

Although the disclosure has been disclosed in the foregoing embodiments, the embodiments are not intended to limit the disclosure. Persons skilled in the art may make some changes and modifications without departing from the spirit and scope of the disclosure. The protection scope of the disclosure shall be determined by the scope of the appended claims.

What is claimed is:

1. A universal serial bus (USB) signal transmission device, coupled between a first USB circuit and a second USB circuit, the USB signal transmission device comprising:

a signal processing circuit, having a first differential terminal pair and a second differential terminal pair, wherein the first differential terminal pair is adapted to be coupled to a differential pin pair of the first USB circuit, and the second differential terminal pair is adapted to be coupled to a differential pin pair of the second USB circuit;

a switch circuit, having a first terminal and a second terminal, wherein the first terminal is adapted to be coupled to the first USB circuit, and the second terminal is adapted to be coupled to the second USB circuit; and a control circuit, coupled to a control terminal of the switch circuit and a control terminal of the signal processing circuit, wherein the control circuit turns off the switch circuit during a detection period, and detects the switch circuit to obtain a detection result; and the control circuit turns on the switch circuit according to the detection result, and controls a transmission direction of the signal processing circuit, wherein the control circuit detects the first terminal and the second terminal of the switch circuit to obtain the detection result, when the detection result indicates that the first terminal of the switch circuit has a communication protocol signal and the second terminal of the switch circuit has no signal, the control circuit turns on the switch circuit, and sets the transmission direction of the signal processing circuit to "transmit from the first differential terminal pair to the second differential terminal pair", and when the detection result indicates that the first terminal of the switch circuit has no signal and the second terminal of the switch circuit has the communication protocol signal, the control circuit turns on the switch circuit, and sets the transmission direction of the signal processing circuit to "transmit from the second differential terminal pair to the first differential terminal pair".

2. The USB signal transmission device according to claim 1, wherein the switch circuit comprises:

a first switch, having a first terminal and a second terminal, wherein the first terminal of the first switch is coupled to a first side band use (SBU) pin of the first USB circuit, and the second terminal of the first switch is adapted to be coupled to a first SBU pin of the second USB circuit; and a second switch, having a first terminal and a second terminal, wherein the first terminal of the second switch is coupled to a second SBU pin of the first USB circuit, and the second terminal of the second switch is adapted to be coupled to a second SBU pin of the second USB circuit; wherein the control circuit is coupled to a control terminal of the first switch and a control terminal of the second switch, and the detection result comprises a first detection result and a second detection result;

during the detection period, the control circuit turns off the first switch and the second switch, the control circuit detects the first terminal of the first switch and the first terminal of the second switch to obtain the first detection result, and the control circuit detects the second terminal of the first switch and the second terminal of the second switch to obtain the second detection result;

the control circuit turns on the first switch and the second switch according to the first detection result and the second detection result, and controls the transmission direction of the signal processing circuit; and the control circuit further determines whether to end the detection period to enter a transmission period according to the first detection result and the second detection result.

3. The USB signal transmission device according to claim 2, wherein when the first detection result indicates that there is the communication protocol signal and the second detection result indicates that there is no signal, the control circuit turns on the first switch and the second switch, and sets the transmission direction of the signal processing circuit to "transmit from the first differential terminal pair to the second differential terminal pair"; and when the first detection result indicates that there is no signal and the second detection result indicates that there is the communication protocol signal, the control circuit turns on the first switch and the second switch, and sets the transmission direction of the signal processing circuit to "transmit from the second differential terminal pair to the first differential terminal pair", wherein the communication protocol signal comprises a periodic pulse signal.

4. The USB signal transmission device according to claim 2, wherein when the first detection result indicates that there is no signal and the second detection result indicates that there is no signal, the control circuit maintains the detection period;

when the first detection result indicates that there is the communication protocol signal and the second detection result indicates that there is the communication protocol signal, the control circuit maintains the detection period; and when one of the first detection result and the second detection result indicates that there is no signal and the other of the first detection result and the second detection result indicates that there is the communication protocol signal, the control circuit ends the detection period to enter the transmission period.

5. The USB signal transmission device according to claim 2, wherein the control circuit comprises:

a first voltage comparator, having a first input terminal and a second input terminal, respectively coupled to the first terminal of the first switch and the first terminal of the second switch;

a second voltage comparator, having a first input terminal and a second input terminal, respectively coupled to the second terminal of the first switch and the second terminal of the second switch; and a toggling detector, coupled to an output terminal of the first voltage comparator to obtain the first detection result and coupled to an output terminal of the second voltage comparator to obtain the second detection result, wherein the toggling detector is configured to control the transmission direction of the signal processing circuit according to the first detection result and the second detection result.

6. The USB signal transmission device according to claim 5, wherein during the detection period, the toggling detector turns off the first switch and the second switch, and the toggling detector enables the first voltage comparator and the second voltage comparator to obtain the first detection result and the second detection result; and the toggling detector turns on the first switch and the second switch according to the first detection result and the second detection result, and the toggling detector disables the first voltage comparator and the second voltage comparator.

7. The USB signal transmission device according to claim 1, wherein the signal processing circuit comprises:

a first routing circuit, having a common differential terminal pair as the first differential terminal pair of the signal processing circuit;

a second routing circuit, having a common differential terminal pair as the second differential terminal pair of the signal processing circuit;

a first amplifier, having an output terminal pair coupled to a first selection differential terminal pair of the first routing circuit, wherein an input terminal pair of the first amplifier is coupled to a first selection differential terminal pair of the second routing circuit; and a second amplifier, having an input terminal pair coupled to a second selection differential terminal pair of the first routing circuit, wherein an output terminal pair of the second amplifier is coupled to a second selection differential terminal pair of the second routing circuit, wherein the control circuit controls the first routing circuit and the second routing circuit according to the detection result.

8. An operation method of a USB signal transmission device, comprising:
    connecting a first USB circuit and a second USB circuit with the USB signal transmission device;
    turning off a switch circuit in the USB signal transmission device, and detecting a first terminal and a second terminal of the switch circuit to obtain a detection result, wherein the first terminal of the switch circuit is adapted to be coupled to the first USB circuit, and the second terminal of the switch circuit is adapted to be coupled to the second USB circuit;
    controlling a transmission direction of a signal processing circuit in the USB signal transmission device according to the detection result, and turning on the switch circuit, wherein a first differential terminal pair of the signal processing circuit is adapted to be coupled to a differential pin pair of the first USB circuit, and a second differential terminal pair of the signal processing circuit is adapted to be coupled to a differential pin pair of the second USB circuit;
    setting the transmission direction of the signal processing circuit to "transmit from the first differential terminal pair to the second differential terminal pair" when the detection result indicates that the first terminal of the switch circuit has a communication protocol signal and the second terminal of the switch circuit has no signal; and
    setting the transmission direction of the signal processing circuit to "transmit from the second differential terminal pair to the first differential terminal pair" when the detection result indicates that the first terminal of the switch circuit has no signal and the second terminal of the switch circuit has the communication protocol signal.

9. The operation method according to claim 8, further comprising:
    turning off a first switch and a second switch of the switch circuit, detecting a first terminal of the first switch and a first terminal of the second switch to obtain a first detection result, and detecting a second terminal of the first switch and a second terminal of the second switch to obtain a second detection result during a period of detecting the first terminal and the second terminal of the switch circuit, wherein the first terminal of the first switch is adapted to be coupled to a first SBU pin of the first USB circuit, the second terminal of the first switch is adapted to be coupled to a first SBU of the second USB circuit, the first terminal of the second switch is adapted to be coupled to a second SBU pin of the first USB circuit, and the second terminal of the second switch is adapted to be coupled to a second SBU pin of the second USB circuit; and
    controlling the transmission direction of the signal processing circuit according to the first detection result and the second detection result, and turning on the first switch and the second switch.

10. The operation method according to claim 9, further comprising:
    setting the transmission direction of the signal processing circuit to "transmit from the first differential terminal pair to the second differential terminal pair" when the first detection result indicates that there is the communication protocol signal and the second detection result indicates that there is no signal; and
    setting the transmission direction of the signal processing circuit to "transmit from the second differential terminal pair to the first differential terminal pair" when the first detection result indicates that there is no signal and the second detection result indicates that there is the communication protocol signal.

11. The operation method according to claim 9, further comprising:
    determining whether to end detection of the first terminal and the second terminal of the switch circuit to control the transmission direction of the signal processing circuit according to the first detection result and the second detection result, and turning on the first switch and the second switch.

12. The operation method according to claim 11, further comprising:
    maintaining the detection period when the first detection result indicates that there is no signal and the second detection result indicates that there is no signal;
    maintaining the detection period when the first detection result indicates that there is the communication protocol signal and the second detection result indicates that there is the communication protocol signal; and
    ending the detection of the first terminal and the second terminal of the switch circuit to control the transmission direction of the signal processing circuit, and turning on the first switch and the second switch when one of the first detection result and the second detection result indicates that there is no signal and the other of the first detection result and the second detection result indicates that there is the communication protocol signal.

13. The operation method according to claim 9, further comprising:
    comparing, by a first voltage comparator, a voltage of the first terminal of the first switch with a voltage of the first terminal of the second switch to obtain the first detection result; and
    comparing, by a second voltage comparator, a voltage of the second terminal of the first switch with a voltage of the second terminal of the second switch to obtain the second detection result.

14. The operation method according to claim 13, further comprising:
    enabling the first voltage comparator and the second voltage comparator to obtain the first detection result and the second detection result during the period of detecting the first terminal and the second terminal of the switch circuit; and
    disabling the first voltage comparator and the second voltage comparator during a period when the transmission direction of the signal processing circuit is controlled and the first switch and the second switch are turned on.

15. A USB cable, comprising:
    a first USB circuit;
    a second USB circuit; and
    a USB signal transmission device, comprising:
    a signal processing circuit, having a first differential terminal pair and a second differential terminal pair, wherein the first differential terminal pair is coupled to a differential pin pair of the first USB circuit, and the second differential terminal pair of the signal processing circuit is coupled to a differential pin pair of the second USB circuit;
    a switch circuit, having a first terminal and a second terminal, wherein the first terminal is coupled to the first USB circuit, and the second terminal is coupled to the second USB circuit; and a control circuit, coupled to a control terminal of the switch circuit and a control terminal of the signal processing circuit, wherein during a detection period, the control circuit turns off the switch circuit, and the control circuit detects the first terminal and the second terminal of the switch circuit to obtain a detection result; and during a transmission period after the detection period, the control circuit turns on the switch circuit, and the control circuit controls a transmission direction of the signal processing circuit according to the detection result, wherein when the detection result indicates that the first terminal of the switch circuit has a communication protocol signal and the second terminal of the switch circuit has no signal, the control circuit sets the transmission direction of the signal processing circuit to "transmit from the first differential terminal pair to the second differential terminal pair", and when the detection result indicates that the first terminal of the switch circuit has no signal and the second terminal of the switch circuit has the communication protocol signal, the control circuit sets the transmission direction of the signal processing circuit to "transmit from the second differential terminal pair to the first differential terminal pair".

16. The USB cable according to claim 15, wherein the switch circuit comprises:

a first switch, having a first terminal and a second terminal, wherein the first terminal of the first switch is coupled to a first SBU pin of the first USB circuit, and the second terminal of the first switch is coupled to a first SBU pin of the second USB circuit; and a second switch, having a first terminal and a second terminal, wherein the first terminal of the second switch is coupled to a second SBU pin of the first USB circuit, and the second terminal of the second switch is coupled to a second SBU pin of the second USB circuit; wherein the control circuit is coupled to a control terminal of the first switch and a control terminal of the second switch, and the detection result comprises a first detection result and a second detection result;

during the detection period, the control circuit turns off the first switch and the second switch, the control circuit detects the first terminal of the first switch and the first terminal of the second switch to obtain the first detection result, and the control circuit detects the second terminal of the first switch and the second terminal of the second switch to obtain the second detection result;

during the transmission period, the control circuit turns on the first switch and the second switch, and the control circuit controls the transmission direction of the signal processing circuit according to the first detection result and the second detection result; and the control circuit further determines whether to end the detection period to enter the transmission period according to the first detection result and the second detection result.

17. The USB cable according to claim 16, wherein when the first detection result indicates that there is the communication protocol signal and the second detection result indicates that there is no signal, the control circuit sets the transmission direction of the signal processing circuit to "transmit from the first differential terminal pair to the second differential terminal pair"; and when the first detection result indicates that there is no signal and the second detection result indicates that there is the communication protocol signal, the control circuit sets the transmission direction of the signal processing circuit to "transmit from the second differential terminal pair to the first differential terminal pair".

18. The USB cable according to claim 16, wherein when the first detection result indicates that there is no signal and the second detection result indicates that there is no signal, the control circuit maintains the detection period;

when the first detection result indicates that there is the communication protocol signal and the second detection result indicates that there is the communication protocol signal, the control circuit maintains the detection period; and when one of the first detection result and the second detection result indicates that there is no signal and the other of the first detection result and the second detection result indicates that there is the communication protocol signal, the control circuit ends the detection period to enter the transmission period.

19. The USB cable according to claim 16, wherein the control circuit comprises:

a first voltage comparator, having a first input terminal and a second input terminal, respectively coupled to the first terminal of the first switch and the first terminal of the second switch;

a second voltage comparator, having a first input terminal and a second input terminal, respectively coupled to the second terminal of the first switch and the second terminal of the second switch; and a toggling detector, coupled to an output terminal of the first voltage comparator to obtain the first detection result and coupled to an output terminal of the second voltage comparator to obtain the second detection result, wherein the toggling detector is configured to control the transmission direction of the signal processing circuit according to the first detection result and the second detection result.

20. The USB cable according to claim 19, wherein during the detection period, the toggling detector turns off the first switch and the second switch, and the toggling detector enables the first voltage comparator and the second voltage comparator to obtain the first detection result and the second detection result; and during the transmission period, the toggling detector turns on the first switch and the second switch, and the toggling detector disables the first voltage comparator and the second voltage comparator.

21. The USB cable according to claim 15, wherein the signal processing circuit comprises:

a first routing circuit, having a common differential terminal pair as the first differential terminal pair of the signal processing circuit;

a second routing circuit, having a common differential terminal pair as the second differential terminal pair of the signal processing circuit;

a first amplifier, having an output terminal pair coupled to a first selection differential terminal pair of the first routing circuit, wherein an input terminal pair of the first amplifier is coupled to a first selection differential terminal pair of the second routing circuit; and a second amplifier, having an input terminal pair coupled to a second selection differential terminal pair of the first routing circuit, wherein an output terminal pair of the second amplifier is coupled to a second selection differential terminal pair of the second routing circuit, wherein the control circuit controls the first routing circuit and the second routing circuit according to the first detection result and the second detection result.

* * * * *